United States Patent [19]

Murton

[11] 3,897,244

[45] July 29, 1975

[54] METHOD FOR REFINING IRON-BASE METAL

[76] Inventor: Crawford B. Murton, 1906 Brushcliff Rd., Pittsburgh, Pa. 15221

[22] Filed: June 8, 1973

[21] Appl. No.: 368,118

[52] U.S. Cl. .......................... 75/53; 75/54; 75/55; 75/94
[51] Int. Cl.² ...................... C21C 7/00; C22B 9/10
[58] Field of Search .................................. 75/53, 56

[56] References Cited
UNITED STATES PATENTS

| | | | |
|---|---|---|---|
| 2,665,982 | 1/1954 | Crego | 75/55 |
| 2,781,256 | 2/1957 | Richards | 75/53 |
| 2,855,291 | 10/1958 | Litton | 75/54 |
| 3,799,762 | 3/1974 | Cass | 75/54 |
| 3,802,865 | 4/1974 | Ohkubo | 75/53 |

*Primary Examiner*—Peter D. Rosenberg

[57] ABSTRACT

A method for refining iron-base metal such as pig iron which contains minor amounts of elements including silicon, manganese, phosphorus, carbon, sulfur, and other incidental impurities, characterized by the steps of containing molten iron-base metal in a metallurgical vessel, heating and oxidizing the molten metal to cause chemical reactions to remove excessive contents of the said elements, adding slag conditioners of relatively high basicity (lime-to-silica ratios of 2.5:1 to 4.0:1) which conditioners consist essentially of oxides of selected metals including iron, manganese, silicon, magnesium, and calcium, and which conditioners have a melting point of from about 2000° to 2800°F, and continuing to heat while oxidizing the mixture of the molten metal, slag conditioner, and slag-forming materials until said minor amounts of elements are reduced to the desired percentages, and are retained in the slag formed. More specifically, the function of the slag-conditioner is to eliminate the encapsulation of large particles of lime by dicalcium silicate and thereby more rapidly taking the lime into solution. Thus, the need for fluorspar is eliminated.

14 Claims, 1 Drawing Figure

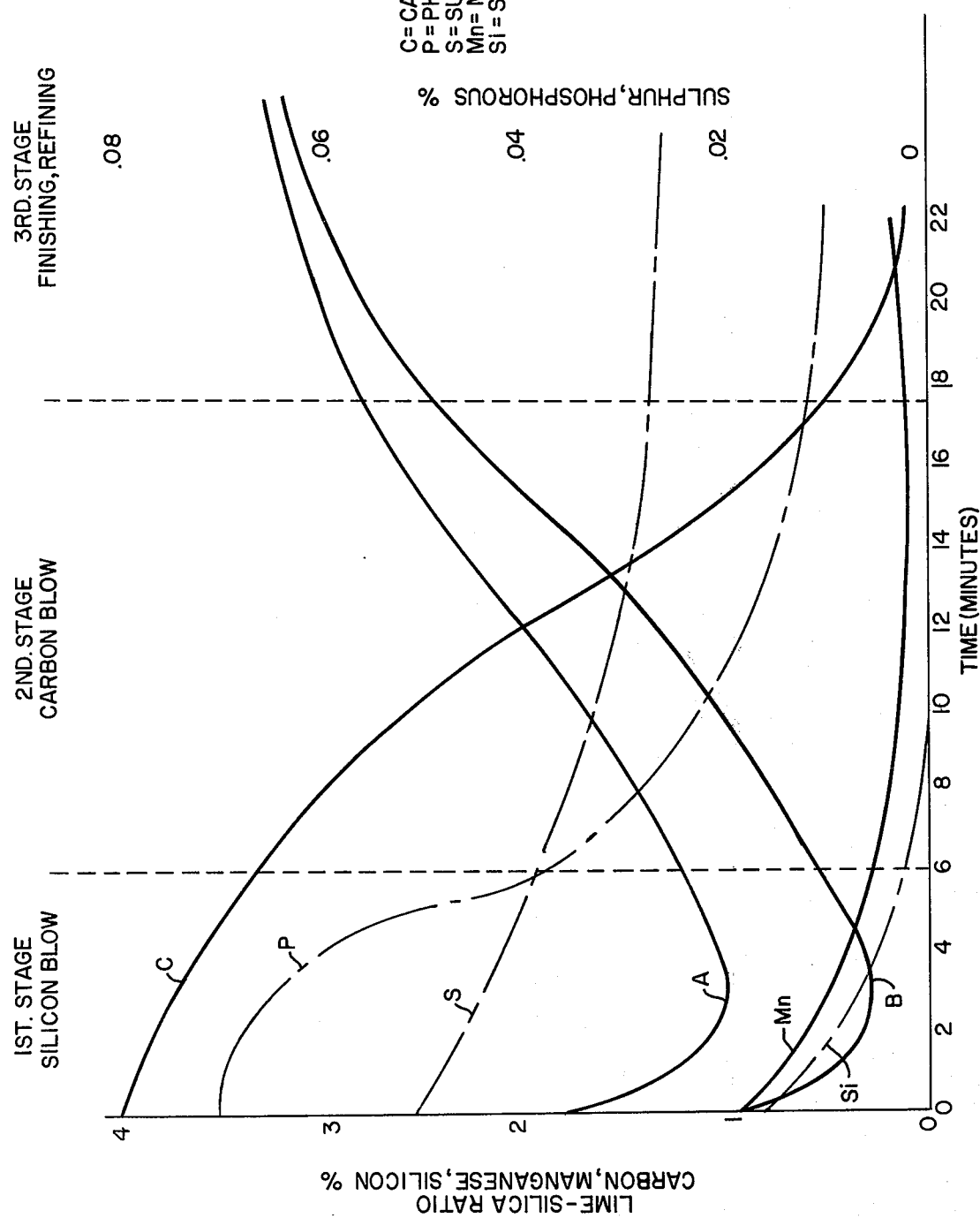

METHOD FOR REFINING IRON-BASE METAL

CROSS-REFERENCE TO RELATED APPLICATION

This application is related to the invention disclosed in the application of C. B. Murton, Ser. No. 435,093, filed Jan. 21, 1974.

BACKGROUND OF THE INVENTION

1. Field of the Invention

This invention relates to a method for refining iron-base metals and, more particularly, it pertains to a method for converting molten iron to steel.

2. Description of the Prior Art

The current practice in refining steel, either in an open hearth furnace or a basic oxygen converter, consists of additions of burnt lime, dolomitic lime, and fluorspar to form a basic slag that reacts with the oxidation products of silicon, carbon, manganese, phosphorus, sulfur, and incidental impurities from the charged materials which normally consist of steel scrap and hot metal from the blast furnace. Normally, the cold scrap is charged into the furnace or converter, the hot metal is then added, and the refining procedure commences. Burnt lime, dolomitic lime, and spar additions are made to the bath in order to provide the desired slag composition. The silicon in the hot metal is first oxidized and molten silica is formed and mixes with the mixture of burnt lime, dolomitic lime and fluorspar.

Inasmuch as burnt lime and dolomitic lime have melting points in excess of 4500°F, the particles or chunks of those slag-forming limes are substantially immersed in the molten silica which forms a layer of dicalcium silicate that completely envelopes the exterior of each basic particle of burnt lime and dolomitic lime. The resulting material is highly refractory and has an even lower rate of solubility than the original burnt lime and therefore inhibits the solution of lime and extends the time required to accomplish lime solution. This is perhaps the most significant barrier to the early creation of a desirable slag composition in the overall refining process.

When the slag-forming materials and spar are added to the conventional charge, the ratio of lime-to-silica is approximately one-to-one. During the first stage of oxidation (silicon blow) silicon oxidizes to silica and lowers the ratio of lime to silica below the one-to-one proportion. As the amount of silicon available for oxidation diminishes and the amount of silica forming diminishes, and a minimum ratio, for example, of from 0.4 to 1, is reached, the basicity of the slag subsequently formed slowly increases as the solid basic particles of burnt lime and dolomitic lime begin to go into solution. Fluorspar has been used to speed up lime solution rate, but it does not prevent refractory encapsulation of the lime particles. Instead, it reacts to disrupt these envelopes and therefore its impact is confined to the latter stages of the process. Further, fluorspar produces noxious and corrosive compounds and liberates poisonous fluorine gas. Therefore, steel producers are actively seeking a better material that will equal or exceed fluorspar's acceleration of lime solution rate and that will not have its harmful side effects. Further, fluorspar supply is limited and the price has increased continuously over the past 20 years. Currently from about 3 to 25 pounds of fluorspar are used per ton of steel produced depending on local steel works raw material parameters.

SUMMARY OF THE INVENTION

It has been found in accordance with this invention that the foregoing problems may be overcome by a method for refining pig iron in a metallurgical vessel by adding solid lime and slag-conditioners consisting essentially of oxides of the metals including iron, manganese, calcium, magnesium and silicon. The slag-conditioners consist essentially of, by weight percent, from about 5–50% iron oxide, from about 2–20 percent manganese oxide, from about 2–15% magnesium oxide, from about 20 to 50 percent calcium oxide, and from about 8–25% silicon oxide. The slag conditioners range in melting point from 2000° to 2800°F. The function of these slag-conditioners is to expedite taking the solid lime additions into solution. The process of this invention avoids the prior art process of refractory encapsulation that occurs when the solid lime particles are surrounded by molten silica formed in the oxidation reactions. The slag-conditioners melt at low temperature 2000° to 2800°F to form a liquid of high basicity in which the solid lime particles are immersed. This precludes formation of the refractory envelope of dicalcium silicate and permits the rapid liquifaction of the lime particles consistent with phase-diagram relationships. Thus, at any given stage of the process higher lime-silica ratios are extant since more of the solid lime particles are taken into solution per unit of time.

DESCRIPTION OF THE DRAWING

For a better understanding of this invention reference is made to the single FIGURE of the drawing which is a graph showing changes in the lime-silica ratio, carbon, manganese, silicon, sulfur and phosphorus with time.

DESCRIPTION OF THE PREFERRED EMBODIMENT

The process of the present invention comprises the steps of:

1. containing molten iron-base metal in a metallurgical vessel, 2. heating and oxidizing the molten iron-base metal to reduce the minor amounts of such elements as silicon, manganese, phosphorus, sulfur and carbon, 3. adding a mixture of a slag-conditioner and burnt lime with or without dolomitic lime consisting essentially of oxides of the metals including iron, manganese, magnesium, calcium and silicon and having a melting point of from about 2000° to 2800°F, and 4. continuing to heat and oxidize the molten metal until the desired compositions of said elements are obtained.

The process of this invention may be carried out in any one of a number of types of refining furnaces, such as the open hearth furnace, basic oxygen converter, submerged oxygen converter, and electric furnace. Some differences in procedure may exist but are inconsequential to the overall results and particularly the type of slag used. For the purposes of description of this invention, the basic oxygen process is described with exceptions for the other processes noted where pertinent.

After the converter is charged with controlled amounts of steel scrap and molten iron, it is rotated to an upright position and an oxygen lance is inserted through the open top to a predetermined position above the surface of the bath. Molten metal is pig iron which consists primarily of the element iron combined with numerous other chemical elements including carbon, manganese, phosphorus, sulfur, and silicon, those elements may consist of from about 3.0 to 4.5 percent carbon, from 0.15 to 2.5 percent manganese, as much as 0.2 percent sulfur, from 0.025 to 2.5 percent phosphorus, and from 0.5 to 4.0 percent silicon, depending upon such factors as the composition of the raw materials and the manner in which the blast furnace is operated.

These elements must be removed almost entirely or reduced in amount during the refining or converting of the molten metal into steel. For that purpose, in the basic oxygen furnace, substantially pure oxygen gas is directed from a lance or jet nozzle at a high velocity and under a pressure of between 140 and 180 pounds per square inch. The resulting phenomenon is partly physical and partly chemical. As the oxygen strikes the liquid metal bath, oxidation of silicon to form silica commences, and conforms to the violent flow path created by the dynamic input of the oxygen stream.

Within about two minutes, preferably one minute, it is necessary to add the slag-conditioner and slag-forming materials in order to cope with the amounts of silica formed as well as other oxides such as iron oxide. For other steel making processes such as the open hearth furnace and electric furnace, the time period is longer, i.e. up to one hour or more. The slag-conditioner may be added before, during, or after the additions of burnt or burnt lime and dolomitic lime.

The characteristics of a desirable slag-conditioner are high fluidity, low melting point, high reactivity in the initial stages of the melting operation, high basicity, non-contamination, and low cost. Slag-conditioners of this invention consist essentially of the materials and amounts listed in the following Table:

TABLE

| | Percent by Weight | | |
|---|---|---|---|
| Compound | Useful Amounts | Preferred Amounts | Optimum Amounts |
| Iron Oxide | 5–50 | 15–30 | 25 |
| Manganese Oxide | 2–20 | 5–15 | 10 |
| Magnesium Oxide | 0–15 | 8–10 | 9 |
| Calcium Oxide | 20–50 | 30–48 | 42 |
| Silicon Oxide | 8–25 | 10–16 | 14 |

Although the particle size of the materials added may vary widely from fine to coarse without seriously reducing their chemical effectiveness, the preferred size range is from about ¾ inch to 1¼ inch average diameter. Manifestly, the particle size should not be so fine as to be blown from the converter.

The materials comprising the slag-conditioners of this invention are primarily obtained by the recovery of slags from prior refining processes, such as from the open hearth furnace, the electric furnace, and the basic open hearth converter, or by synthesis of these materials. These materials are crushed to remove gross metallics, screened to the proper size, and blended with oxides of iron, manganese, magnesium, silicon and calcium as required. The oxides of the several metals indicated may be obtained from such sources as flue dust from steel making processes which are essentially iron oxide, ferromanganese dust from the blast furnaces which are rich in iron and manganese oxide as well as metallic manganese, lime dust from cement plants, and the like which are oxides of calcium and magnesium. These materials are synthesized into desired particle sizes and blended to desired compositions.

Synthesis of the recovered slags may be accomplished in various ways, such as mixing a moistened amount of dust, for example, flue dust with finely powdered quartzite or disposable glass particles and sodium silicate, or other hydraulic binders, and allowing the mixture to set with the aid of heat or dry air. Another technique for synthesizing involves the use of these materials with sodium silicate, and carbon dioxide gas injection which causes solidification into larger shapes of the combined ingredients and crushed for charging into the converter.

Molten slags from basic open hearth and basic oxygen processes may be treated with borax, sodium silicate, oxides of alkaline metals or silica to depress the melting point. The slag is then blended with oxides of iron, manganese, magnesium, and calcium, as required, to provide the compositions indicated in the Table.

Another method for preparing these slag-conditioners involves pouring of molten slag onto a blended mixture of oxides of iron, manganese, magnesium, silica, and calcium to form a heterogeneous mass which is cooled, crushed, and sized for addition to the basic oxygen converter.

Molten slags recovered from the various processes may be blended with or without oxides of iron, manganese, magnesium, silicon, and calcium to form slag-conditioners to be aded to basic oxygen converters, or some slag from a previous heat may be retained in the converter or furnace for use with the next heat.

These slags may also be treated with synthetic oxides of the above-mentioned metals to produce slag-conditioners for use in the liquid state in the basic oxygen converter. Finally, molten slag of high basicity may be treated with the oxides of the above-mentioned metals, blended with the hot metal, and poured into the converter.

The useful quantity of slag-conditioner is from about 3 to 50 pounds per ton of steel and the useful quantities of slag formers (burnt lime or burnt lime and dolomitic lime) are additions of from about 110 to 200 pounds per ingot ton. The preferred range of slag-conditioner is from about 12 to 22 pounds per ton of steel and the optimum for best results is about 17.5 pounds pertain of steel. Generally, the addition occurs one minute after the oxygen blowing has commenced.

The melting point of the slag-conditioner is preferably less than that of the hot-metal charge and in the range of 2000° to 2800°F as compared with burnt lime and dolomitic lime melting points in excess of 4500°F.

When the slag-conditioner is added along with burnt lime and dolomitic lime, fluorspar is not necessary. The conditioner melts rapidly to form a basic pool that surrounds the burnt lime and dolomitic lime particles and thereby prevents the formation of the dicalcium silicate envelope or layer around each basic particle which occurs in the conventional process. The rate of solution of burnt lime and dolomitic lime is greatly increased. Further, the high iron oxide content of the conditioner accelerates phosphorus oxidation and helps to hold it in solution during the slag formation. It is significant that in the early stages of the heat, optimum conditions for the removal of phosphorus are provided and in the subsequent stage (carbon blow) higher basicity at lower iron oxide levels is achieved than was possible with the conventional practice where fluorspar was added.

Referring to drawing, curve A is representative of the basicity ratios achieved by adding the slag-conditioners along with the lime additions.

By adding slag conditioners of this invention early in the process, perhaps one or two minutes after commencement of the blowing, the lime-silica ratio is of the order of 1.8:1 to 2:1. Although the ratio decreases as oxidation of silicon in the metal proceeds during the silicon blow, it does not decrease to as low a minimum, under 0.5:1, as under current practice. Thus, the lime-silica ratio is maintained above the 1:1 level and, more importantly, the remaining solid particles of lime are more rapidly taken into solution. Thus, after most of the silicon has been oxidized, the second stage of the heat (carbon blow) commences and the slag formed has a higher lime-silica ratio than is true for current practice.

A comparison of curves A and B (conventional practice) indicates that during the initial stage of the heat "the silicon blow" to the low melting point conditioner creates a highly basic molten pool; that the carbon level is high and consequently that the oxidation level is low; and that the molten bath temperature is low. The substantial iron oxide content of the slag-conditioner establishes the optimum environment for phosphorus removal in this first stage "the silicon blow". This optimum environment for phosphorus removal is known to be characterized by low temperature, high basicity and sufficient iron oxide availability. The second stage of the heat is called the "carbon blow". As carbon is oxidized and removed from the metal bath, the amount of iron oxide being formed increases as the carbon content of the metal decreases. From the drawing, it is obvious that the process of this invention provides higher basicity (lime-silica ratio) at any given carbon and oxidation level when compared to the curve for conventional practice.

Thus, at the start of the carbon blow when iron oxide formation is relatively low, rapid increase in the lime-silica ratio occurs in this invention as the lime is taken into solution very rapidly since dicalcium silicate envelopment of lime-bearing particles has been avoided. In fact, the higher basicity, in relation to a given carbon content and therefore oxidation level, persists throughout the carbon blow stage and into the finishing stage of the heat.

Thus, the conditioners described in this invention have established an optimum environment for sulfur removal in the carbon blow stage, and in the finishing stage. This environment is far more basic at any oxidation level because of rapid lime solution. Sulfur removal proceeds throughout the carbon blow before the high oxidation levels characteristic of the finishing stage are reached. The optimum conditions for sulfur removal are high basicity, low oxidation, high fluidity, and high temperature and these conditions are met through use of these conditioners.

The following examples illustrate the practice of the invention:

EXAMPLE I

A heat was refined in a basic oxygen top blown converter holding 230 tons. One minute after oxygen blowing commenced, 17.5 pounds of slag conditioner, 130 lbs. burnt lime, and 64 lbs. dolomitic lime per ton were added. Hot metal analysis was 3.00% C, 1% Si, 0.87% Mn, 0.113P, 0.026% S. Results: First Turndown Metal Analysis was 0.52% C; 0.008% P; 0.018%S. First Turndown Slag Analysis was 12.03% $SiO_2$; 39.6% CaO; 8.04% MgO; U Ratio 3.29 26.4% Fe; 4.5% Mn; 0.05% S; 0.54% P; 1.1% $Al_2O_3$.

EXAMPLE II

Another heat was made in the same way except that the amount of slag conditioner was increased to 90 lbs. per ton of steel. Although the slag conditioner functioned according to this invention, it resulted in a very fluid slag early in the heat that caused excessive "slopping" that could not be tolerated. However, this large addition demonstrates that the capacity of these conditioners to take lime into solution far exceeds the need of the top blown oxygen converter process.

The advantage of the low melting point of the slag or conditioner as well as its high basic (lime-silica) ratio which is about 3:1 but which may vary from 1:1 to 4:1 before achieving the value of 3:1. is to create an environment that accomplishes the effects described above. In addition, the low melting point of the conditioner permits the extension of the reaction zone around the oxygen stream. In conventional practice, the highly siliceous material, which is essentially a pool of molten silica, is first created in the early stage of blowing, and is conducive to the formation of dicalcium silicate. In contrast with that situation, the flux or conditioner of this invention provides a highly basic liquid pool in intimate association with the solid lime particles. This effect enlarges the spatial reaction zone around the oxygen stream and physically and thermally increases the solution rate of a solid basic particle.

Another outstanding advantage of the slag or conditioner of this invention is that it reduces the rate of erosion of the refractory walls of the basic oxygen converter which rate is at a maximum when the lime-silica ratio of the slag is approximately 0.7:1. As described above, the slag or conditioner of this invention enables the maintenance of a lime silica ratio in excess of 1:1 in the early stages of the heat due to the proper balancing of burnt lime and dolomitic lime.

In addition to the superior conditions for the removal of phosphorus and sulfur, the slag conditioner of this invention eliminates the need for fluorspar in the process.

In conclusion, the slag conditioner of this invention provides a highly basic liquid slag in which burnt lime particles are not subjected to high concentrations of silica, which heretofore formed dicalcium silicate envelopes around the lime and thereby delayed solution of the lime. The slag conditioner contains fluidizers such as oxides of iron, magnesium, and manganese that rapidly take the burnt lime into solution in accordance with established phase diagram relationships. Moreover, the lime fluxing capacity of the slag-conditioner is so great that excessive amounts of this material result in slag that are too fluid and cause "slopping" in the converter. This factor shows that the slag-conditioner of this invention has the capability of increasing lime solution rates far beyond the requirements of the basic oxygen converter processes, whether submerged or top blown.

The lime solution rates that can be achieved with the slag-conditioners are rapid enough to exceed the rate of oxidation of the carbon in the iron bearing molten metal. Thus, optimum conditions for phosphorus and sulfur removal are provided before the oxiddation of carbon is completed.

Finally, another advantage of this invention is that by maintaining a strongly basic slag there is less erosion of the refractory lining of the walls of the metallurgical vessel.

What is claimed is:

1. A steel refining process for facilitating the solution of solid lime by inhibiting the formation of dicalcium silicate, comprising the steps of
  a. adding to a molten body of iron-base metal a quantity of solid burnt lime and a material having high basicity and not including fluorspar and having a melting point lower than that of the solid burnt lime to provide a slag devoid of encapsulated solid bodies of burnt lime,
  b. maintaining the metal molten during a first stage refining period and sustaining a slag lime-silica ratio of at least 1:1 while oxidizing a substantial amount of silicon as well as some of the carbon, and
  c. maintaining the metal molten after most of the silicon has been oxidized and during a second-stage refining period and increasing the lime-silica ratio to at least 2.5:1 while reducing substantially the amount of carbon and increasing the amount of iron oxide formed.

2. The process of claim 1 wherein the high basicity material comprises a lime-to-silica ratio varying of from about 2.5:1 to 4.0:1.

3. The process of claim 2 wherein the high basicity material consists essentially of oxides of at least one metal selected from the group consisting of calcium, iron, magnesium, manganese, and silicon.

4. The process of claim 2 wherein there are 3 to 50 pounds of high basicity material per ton of molten metal.

5. The process of claim 1 wherein the melting point of the high basically material is from about 2000° to 2800°F.

6. The process of claim 4 wherein there are from 110 to 200 pounds of burnt lime for each ton of molten metal.

7. The process of claim 2 wherein there are from about 12 to 22 pounds of said material per ton of molten metal.

8. The process of claim 1 wherein said material consists essentially of for each ton of molten metal, a blend of from about 3 to 50 pounds of slag of at least one of a prior basic oxygen process, open hearth process, and electric furnace process, which material is added with 100 to 200 pounds of burnt lime.

9. The process of claim 8 wherein for each ton of molten metal there are from about 12 to 22 pounds per ton of said material.

10. The process of claim 8 wherein there are about 17.5 pounds of said material.

11. The process of claim 3 wherein the high basicity material consists essentially of by weight percent, from about 5 to 50% iron oxide, from about 2 to 20% manganese oxide, up to about 15% magnesium oxide, from about 20 to 50% calcium oxide, and from about 8 to 25% silicon oxide.

12. The process of claim 11 wherein there is from about 15 to 30% iron oxide, from about 2 to 20% manganese oxide, from 8 to 10% magnesium oxide, from about 30 to 48% calcium oxide and from about 10 to 16% silicon oxide.

13. The process of claim 12 wherein there is from about 25% iron oxide, about 10% manganese oxide, about 9% magnesium oxide, about 42% calcium oxide, and about 14% silicon oxide.

14. The process of claim 2 in which the high basicity material is substantially free of added fluorspar.

* * * * *